United States Patent [19]
Kishimoto et al.

[11] Patent Number: 5,224,186
[45] Date of Patent: Jun. 29, 1993

[54] OPTICAL FIBER CONNECTOR WITH HOUSING ASSEMBLY FOR AN ASSURING COMPLETE CONNECTION

[75] Inventors: Koji Kishimoto; Takanori Sawai; Ryugen Yonemura, all of Osaka, Japan

[73] Assignee: Sumitomo Electric Industries, Ltd., Osaka, Japan

[21] Appl. No.: 875,328

[22] Filed: Apr. 29, 1992

[30] Foreign Application Priority Data

May 29, 1991 [JP] Japan .................. 3-39339[U]

[51] Int. Cl.$^5$ ............................ G02B 6/36
[52] U.S. Cl. .................... 385/78; 385/72
[58] Field of Search ............ 385/78, 72, 88, 89, 385/90, 91, 92, 93, 94, 60

[56] References Cited

U.S. PATENT DOCUMENTS

| | | | |
|---|---|---|---|
| 4,712,860 | 12/1987 | Corrales | 385/78 |
| 4,889,399 | 12/1989 | Mariani et al. | 385/78 X |
| 5,080,461 | 1/1992 | Pimpinella | 385/35 X |
| 5,125,056 | 6/1992 | Hughes et al. | 385/60 X |

Primary Examiner—Georgia Y. Epps
Assistant Examiner—Phan T. Heartney
Attorney, Agent, or Firm—Lane, Aitken & McCann

[57] ABSTRACT

An optical connector comprising a first housing for supporting a ferrule, a second housing having a ferrule holder into which the ferrule is inserted with a predetermined frictional resistance, a spring member for elastically pushing the ferrule into the ferrule holder against the frictional resistance at the time that load as the ferrule is brought into contact with the ferrule holder at a first predetermined stroke position has reached a first predetermined threshold value, and a pair of locking members contacting each other at a second predetermined stroke position, and when load of the contact at the second stroke position has reached a second predetermined threshold value, the contact at the second stroke position being released and then the first housing being further moved in the predetermined direction and the locking members being engaged with each other, wherein the second stroke position is set with respect to the first stroke position so that the locking members can contact each other prior to the contact of the ferrule with the ferrule holder; and the second threshold value is higher than the first threshold value so that the ferrule can be inserted into the ferrule holder by a force of inertia resulting from the release of the contact at the second stroke position.

2 Claims, 3 Drawing Sheets

OPTICAL FIBER CONNECTOR WITH HOUSING ASSEMBLY FOR AN ASSURING COMPLETE CONNECTION

FIELD OF THE INVENTION

The present invention relates to optical connectors, and more particularly to such connectors that are designed to connect an optical fiber with another optical fiber or an opto-electric conversion element, etc.

DESCRIPTION OF THE PRIOR ART

A conventional optical connector of the above kind is disclosed in Japanese Utility Model Laid-open Publication No. 1-73775. The optical connector comprises a ferrule-side housing and a ferrule-holding-side housing to be connected with the ferrule-side housing. The ferrule-side housing supports a ferrule into which the distal end of an optical fiber is inserted. The ferrule-holding-side housing includes a ferrule holder into which the ferrule is inserted. The ferrule-side and ferrule-holding-side housings are provided with locking mechanisms, respectively, in order to maintain a connected state of the two housings. The locking mechanism of the ferrule-side housing comprises an engaging arm that is bendable elastically, and the locking mechanism of the ferrule-holding-side housing comprises an engagement projection that is engaged by the engaging arm. When the ferrule-side housing is connected to the ferrule-holding-side housing, the engaging arm of the ferrule-side housing is first brought into contact with the front end of the engagement projection of the ferrule-holding-side housing. If the contact load between the engaging arm and the engagement projection exceeds a predetermined load, the engaging arm is bent upward and moved across the engagement projection and engages with the rear end of the engagement projection. As a consequence, the two housings of the connector are locked and firmly connected together by the engaging arm and the engagement projection.

The ferrule-side housing for receiving a ferrule mounted on the distal end of an optical fiber is normally provided with a compression spring in order to urge the ferrule toward the ferrule-holding-side housing. The compression spring is one which buffers the impact occurring when the ferrule of the optical fiber is inserted into the ferrule holder, in order to protect the ferrule or an optical component to be connected with the ferrule. The compression spring is compressed by the contact load that occurs when the ferrule is brought into contact with the ferrule holder, and elastically pushes the ferrule into the ferrule holder at the time that an amount of the compression has reached a predetermined stroke, that is, the contact load between the ferrule and the ferrule holder has reached a threshold value.

In the optical connector as described above, the ferrule is first brought into contact with the ferrule holder by pushing the ferrule-side housing into the ferrule-holding-side housing, and when the ferrule-side housing is pushed into by a predetermined stroke, the ferrule is elastically inserted into the ferrule holder by the spring force of the compressed spring. The contact load between the ferrule and the ferrule holder is abruptly decreased if the ferrule passes through the stroke position at which the ferrule is first brought into contact with the ferrule holder. By further pushing the ferrule-side housing into the ferrule-holding-side housing, the engaging arm of the ferrule-side housing is moved across the engagement projection of the ferrule holder housing, then the contact between the engaging arm and the engagement projection is released, and the engaging arm engages with the rear end of the engagement projection. By this engagement, the two housings of the connector are connected together.

In the conventional optical connector, by pushing the ferrule-side housing two times, the ferrule is inserted into the ferrule holder and the locking mechanisms of the two housings are engaged with each other. Therefore, in a case where the connecting operation is performed in a place where the connected state of the optical connector cannot be inspected visually, sometimes the operation is completed when the contact load after the ferrule was inserted is reduced, although the connection of the two housings is incomplete. For this reason, there is the drawback that the incomplete connection of the two housings arises.

It is, accordingly, an important object of the present invention to provide an improved optical connector which is capable of preventing the incomplete connection of the two housings.

SUMMARY OF THE INVENTION

The foregoing object is accomplished in accordance with the present invention by providing an optical connector comprising a first housing (11) for supporting a ferrule (14) into which the distal end of an optical fiber (13) is inserted, a second housing (12) having a ferrule holder (12a) into which the ferrule (14) is inserted with a predetermined frictional resistance, and a spring member (16). The spring member is provided in the first housing for urging the ferrule in the predetermined direction and for elastically pushing the ferrule into the ferrule holder against the frictional resistance at the time that load as the ferrule is brought into contact with the ferrule holder at a first predetermined stroke position (S1) has reached a first predetermined threshold value (F1). The optical fiber further comprises a pair of locking members (11d, 12d) each provided in the first and second housings. The locking members contact each other at a second predetermined stroke position (S2) with the first housing inserted into the second housing by a predetermined stroke. When load of the contact at the second stroke position has reached a second predetermined threshold value (F2), the contact at the second stroke position is released and then the first housing is further moved in the predetermined direction and the locking members are engaged with each other. The second stroke position is set with respect to the first stroke position so that the locking members can contact each other prior to the contact of the ferrule with the ferrule holder. The second threshold value is higher than the first threshold value so that the ferrule can be inserted into the ferrule holder by a force of inertia resulting from the release of the contact at the second stroke position.

In the optical connector constructed as described above, the stroke position at which the locking members contact each other is set so that they can contact each other prior to the contact of the ferrule with the ferrule holder. Therefore, if one housing is inserted into another housing, the locking members contact each other before the ferrule contacts with the ferrule holder, and the contact load between the locking members is increased. When the contact load exceeds a threshold value, the contacted state of the locking members is released and the locking members are engaged with each other. At the same time, a large force of inertia occurs by the release of the contacted state. By this force of inertia, one housing is further pushed into another housing, so that the ferrule can be inserted into the ferrule holder. Therefore, if one housing is inserted into another housing until the contact load between the locking members exceeds a threshold value, then the locking members are engaged with each other and at the same time the ferrule is inserted into the ferrule holder. As a consequence, the housings of the optical connector can be connected together with certainty.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
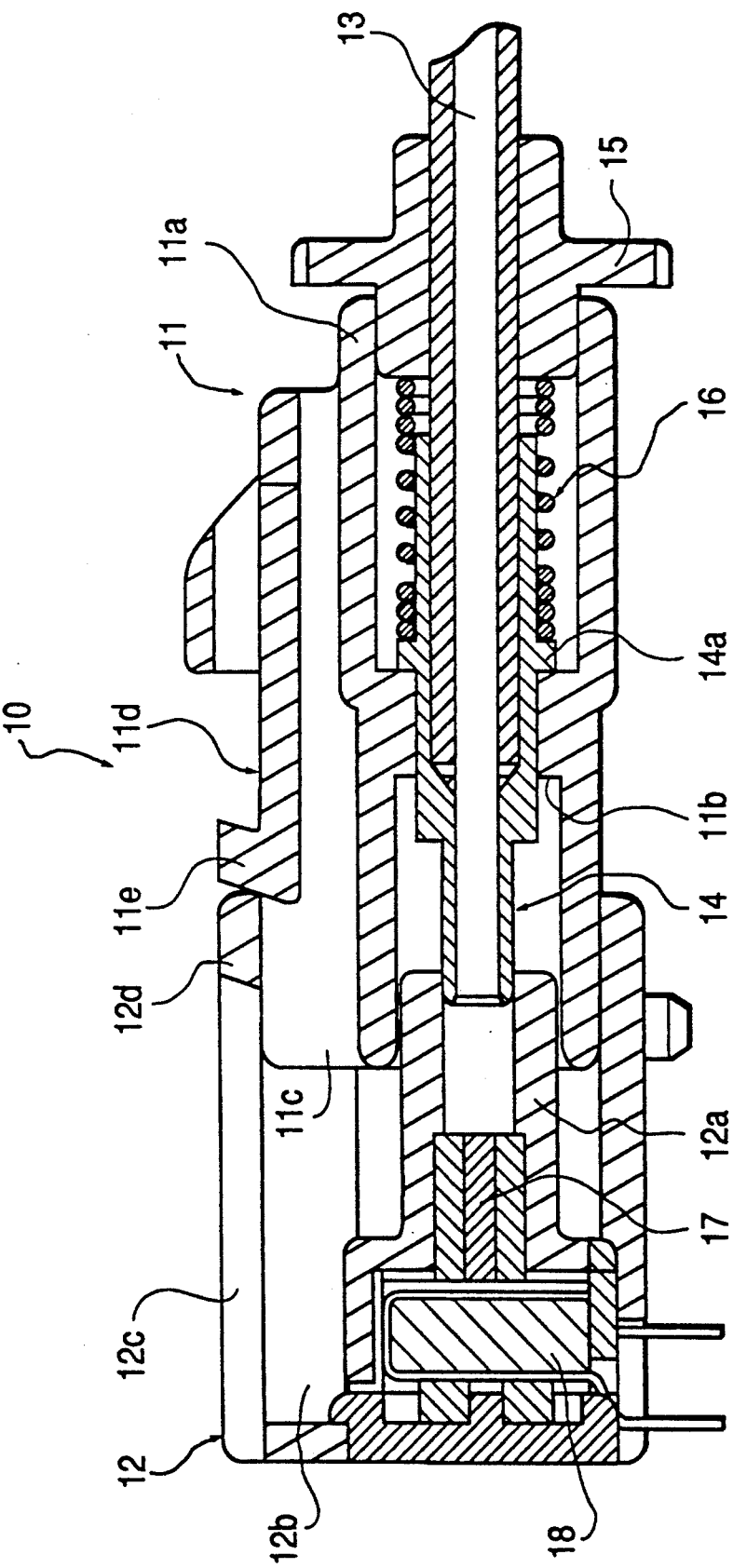
FIG. 1 is a longitudinal sectional view showing an embodiment of an optical connector according to the present invention.

Referring to FIG. 1, there is shown a preferred embodiment of an optical connector 10 in accordance with the present invention. The optical connector 10 comprises a male housing (ferrule-side housing) 11 and a female housing (ferrule-holding-side housing) 12.

The male housing 11 includes a hollow main body 11a which is formed at its axially intermediate portion with a radially inner flange 11b. A ferrule 14 fixed on the distal end of an optical fiber 13 is inserted into and received on the radially inner flange 11b of the hollow main body 11a. The ferrule 14, for example, is a precisely molded good and made of glass-fiber contained phenol or thermosetting resin (e.g., epoxy resin) by transfer molding. The ferrule 14 has a radially outer flange 14a at its axially intermediate portion.

The optical fiber 13 passes through the axial bore of a flange member 15 inserted into the proximal portion of the hollow main body 11a. Between the flange member 15 and the flange 14a of the ferrule 14 there is provided a compression spring 16 by which the ferrule 14 is urged toward the female housing 12.

The hollow main body 11a of the male housing 11 is surrounded by a wall portion 11c, which is formed at its upper portion with a cutout and a locking arm 11d. The locking arm 11d is formed at its free end with an engagement projection 11e.

The female housing 12 is integrally formed with a ferrule holder 12a of hollow cylindrical configuration into which the distal end of the ferrule 14 is inserted. This ferrule holder 12a is provided at its inside with a cemented lens 17 engageable with the distal end face of the ferrule 14 and with an opto-electric conversion element 18 for converting optical information inputted through the cemented lens 17 to an electric signal.

The ferrule holder 12a of the female housing 12 is surrounded by a connecting wall portion 12b into which the hollow main body 11a of the male housing 11 is inserted. This connecting wall portion 12b is formed at its upper portion with a lock groove 12c and a lock portion 12d. The lock portion 12d is engaged through the lock groove 12c by the engagement projection 11e of the locking arm 11d of the male housing 11.

Figure 2:
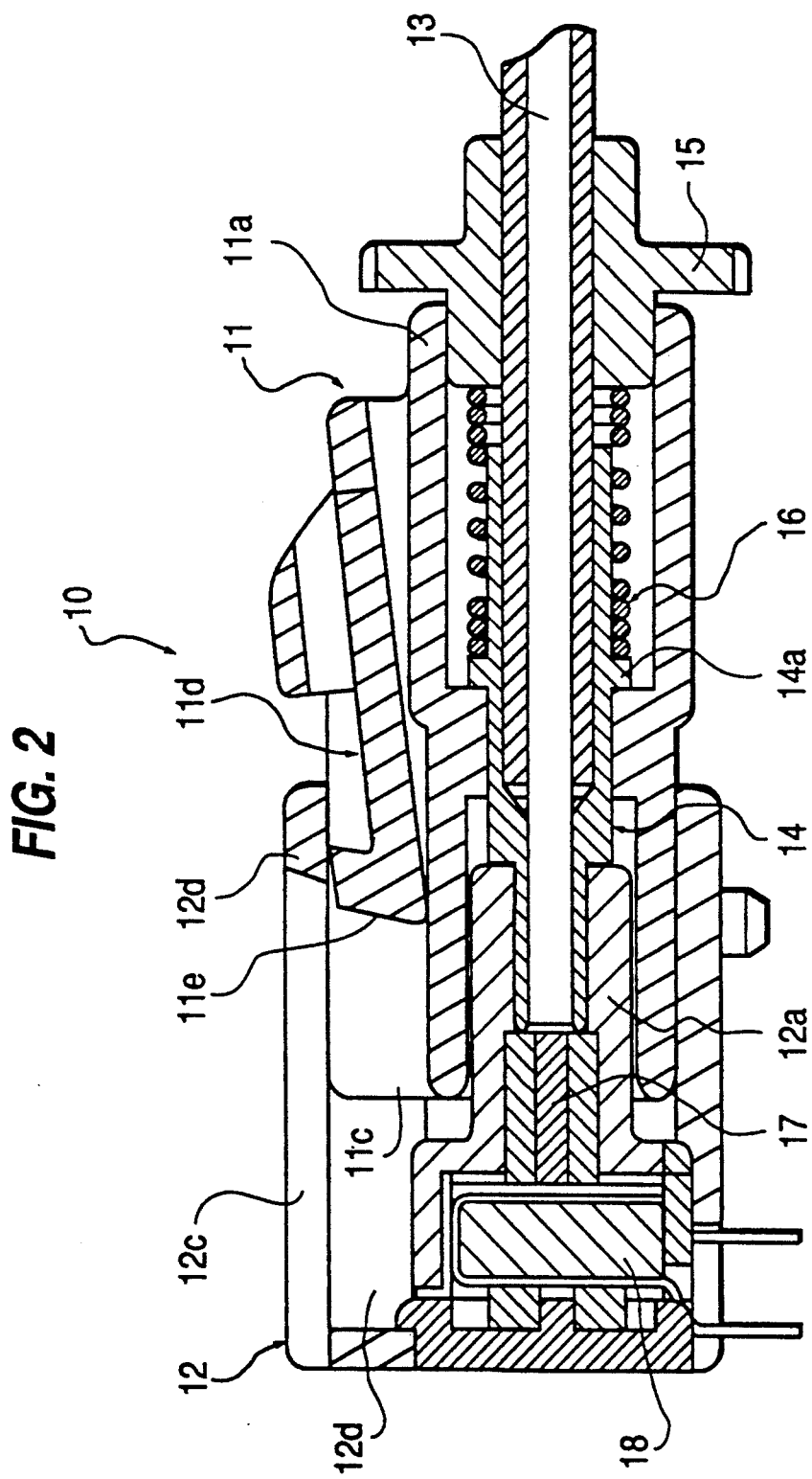
FIG. 2 is a longitudinal sectional view showing the middle state of a connection of the two housings of FIG. 1.

As shown in FIG. 2, the spring constant and length of the compression spring 16 are set so that the ferrule 14 is elastically pushed into the ferrule holder 12a at the time that the contact load as the ferrule 14 is brought into contact with the ferrule holder 12a has reached a threshold value F1. The threshold vale F1 for the ferrule 14, for example, has been set to about 1.5 kgf.

At the time that the contact load as the projection 11e of the locking arm 11d contacts with the front end of the lock portion 12d has reached a threshold value F2, the locking arm 11d bends downward and then the contact between the projection 11e and the lock portion 12d is released. As shown in FIG. 2, the configuration of the projection 11e of the locking arm 11d is formed so that the projection 11e can be locked on the lock portion 12d of the female housing 12 when the projection 11e is axially inwardly moved a predetermined stroke.

Figure 3:
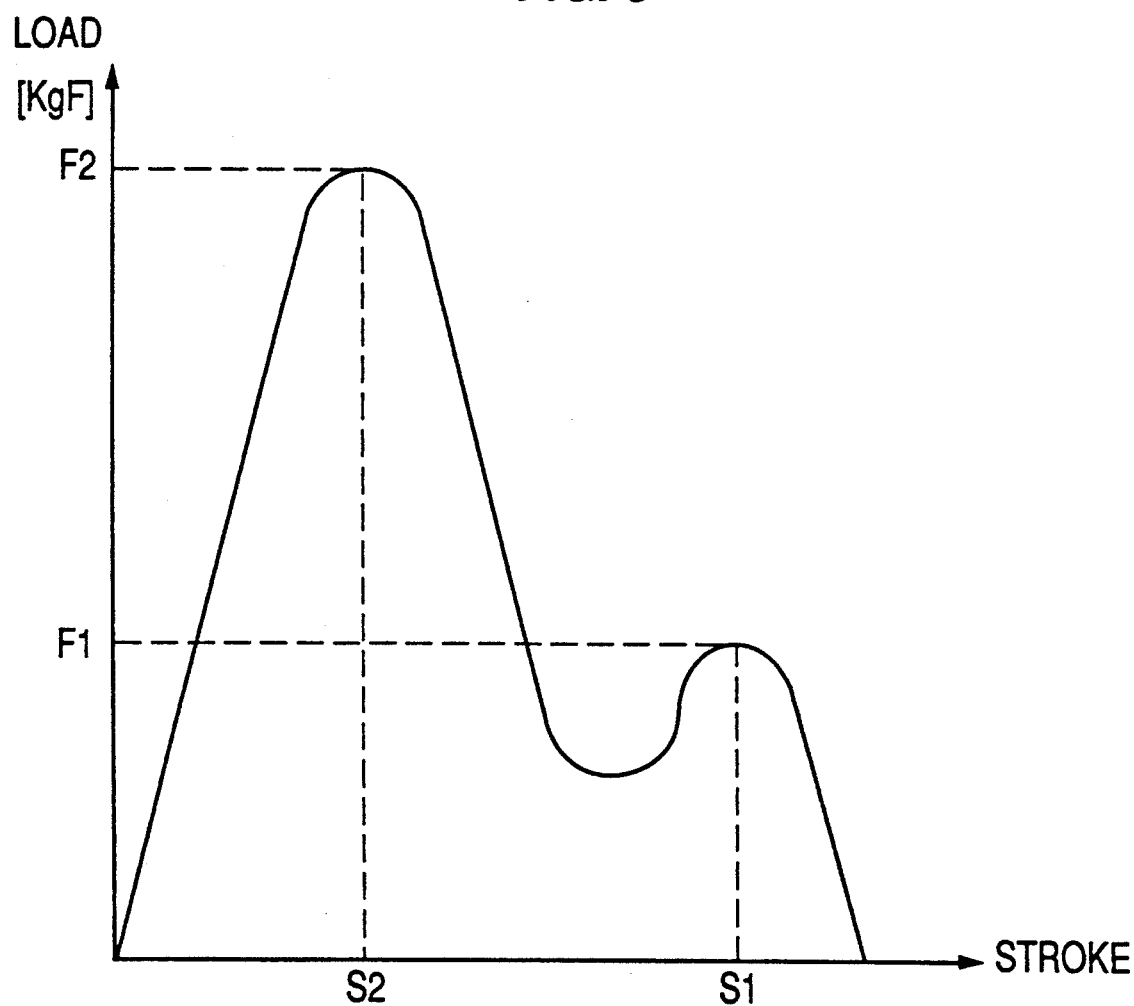
FIG. 3 is a graph showing a characteristic of inertia lock.

As shown in FIG. 3, the threshold value F2 for the locking arm 11d has been set to 2.5 kgf to 3.5 kgf which is higher than the threshold value F1 for the ferrule 14, and the stroke position S2 at which the threshold value F2 occurs is shorter than the stroke position S1 at which the threshold value F1 occurs. As a result, in connecting the male housing 11 and the female housing 12 together, the projection 11e of the locking arm 11d contacts with the front end of the lock portion 12e before the ferrule 14 contacts with the ferrule holder 12a.

As the male housing 11 is pushed into the female housing 12, the contact projection 11e of the locking arm 11d is first brought into contact with the front end of the lock portion 12d of the female housing 12 and the contact load between them will be increased. When this contact load exceeds the threshold value F2, the locking arm 11d is bent downward and the contact of the locking arm 11d with the lock portion 12d is released, as shown in FIG. 2. The locking arm 11d is further moved axially inward and the engagement projection 11e engages with the rear end of the lock portion 12d of the female housing 12. When the contact of the locking arm 11d with the front end of the lock portion 12d is released, a large force of inertia will occur. The large force of inertia causes the male housing 11 to move further into the female housing 12. This further movement causes the ferrule 14 to be inserted into the ferrule holder 12a.

As described above, if one housing 11 (or 12) is pushed into the other housing 12 (or 11) until the contact load between them exceeds the threshold value 12, the locking arm 11d engages with the lock portion 12d of the female housing 12 and at the same time the ferrule 14 is inserted into the ferrule holder 12a by the inertia force resulting from the release of the contact between the locking arm 11d and the lock portion 12d. As a result, both the male and female housings 11 and 12 can be connected together with certainty. Therefore, even in a case where the connecting operation is performed in a place where the connected state of the optical connector 10 cannot be inspected visually, the incomplete connection of both housings can be prevented with certainty.

While it has been described that the male housing 11 is provided with the locking arm 11d, it is noted that the locking arm may be provided in the female housing 12 instead of the male housing 11.

Although the subjection invention has been described with relation to the preferred embodiment, various modifications and adaptations thereof will now be apparent to those skilled in the art. All such modifications and adaptations as fall within the scope of the appended claims are intended to be covered thereby.

What we claim is:

1. An optical fiber connector comprising:

a first housing for supporting a ferrule into which the distal end of an optical fiber is inserted, in such a manner that said ferrule can be freely movable in a predetermined direction;

a second housing having a ferrule holder into which said ferrule is inserted with a predetermined frictional resistance, said first housing being inserted into said second housing;

a spring member provided in said first housing for urging said ferrule in said predetermined direction and for elastically pushing said ferrule into said ferrule holder against said frictional resistance at the time that load as said ferrule is brought into contact with said ferrule holder at a first predetermined stroke position has reached a first predetermined threshold value; and a pair of locking members each provided in said first and second housings, said locking members contacting each other at a second predetermined stroke position with said first housing inserted into said second housing by a predetermined stroke, and when load of the contact at said second stroke position has reached a second predetermined threshold value, the contact at said second stroke position being released and then said first housing being further moved in said predetermined direction upon the release and said locking members being engaged with each other to lock said first and second housings together;

said ferrule of said first housing being automatically inserted into said ferrule holder of said second housing by said spring upon the further movement of said first housing caused by said release.

2. An optical fiber connector as set forth in claim 1, wherein said second stroke position is set with respect to said first stroke position so that said locking members can contact each other prior to the contact of said ferrule with said ferrule holder, and wherein said second threshold value is higher than said first threshold value so that said ferrule can be inserted into said ferrule holder by a force of inertia resulting from the release of the contact at said second stroke position.

* * * * *